United States Patent [19]

Wissmann et al.

[11] Patent Number: 5,750,158
[45] Date of Patent: May 12, 1998

[54] PREHEATING APPARATUS FOR AN EXTRUDER

[75] Inventors: Siegfried R. Wissmann; William T. Schmitt; David E. Murdock, all of Cincinnati, Ohio

[73] Assignee: Cincinnati Milacron Inc., Cincinnati, Ohio

[21] Appl. No.: 308,876

[22] Filed: Sep. 19, 1994

Related U.S. Application Data

[63] Continuation of Ser. No. 8,014, Jan. 22, 1993, abandoned.

[51] Int. Cl.⁶ .................. B29C 47/40; B29C 47/80
[52] U.S. Cl. .............. 425/144; 264/211.23; 366/85; 366/146; 425/204; 425/208; 425/378.1; 425/379.1
[58] Field of Search ................. 425/144, 204, 425/205, 203, 208, 376.1, 378.1, 379.1, 382 R; 264/211.23; 366/85, 146

[56] References Cited

U.S. PATENT DOCUMENTS

| | | | |
|---|---|---|---|
| 3,023,455 | 3/1962 | Geier et al. | 425/208 |
| 3,137,035 | 6/1964 | Hendry | 425/376.1 |
| 3,224,739 | 12/1965 | Schuur | 425/204 |
| 3,256,562 | 6/1966 | Heard, Jr. | 425/382 R |
| 3,577,588 | 5/1971 | Chisholm | 425/376.1 |
| 3,588,956 | 6/1971 | Poux et al. | 425/379.1 |
| 3,632,256 | 1/1972 | Kasting | 425/205 |
| 3,738,409 | 6/1973 | Skidmore | 425/203 |
| 3,884,607 | 5/1975 | Gerhards | 425/144 |
| 4,118,163 | 10/1978 | Lee | 425/205 |
| 4,212,543 | 7/1980 | Bersano | 425/204 |
| 4,385,883 | 5/1983 | Hanslik | 425/204 |
| 4,501,498 | 2/1985 | McKelvey | 425/204 |
| 4,502,858 | 3/1985 | Kertok | 425/204 |
| 4,752,135 | 6/1988 | Loomans | 425/204 |
| 4,892,691 | 1/1990 | Kolossow | 264/54 |
| 4,913,641 | 4/1990 | Zahradnik | 425/204 |
| 4,935,183 | 6/1990 | Wenger et al. | 425/204 |
| 4,959,186 | 9/1990 | Dolhopf et al. | 425/205 |
| 5,153,009 | 10/1992 | Voigt | 425/204 |
| 5,165,941 | 11/1992 | Hawley | 425/205 |

FOREIGN PATENT DOCUMENTS 1190406  10/1959  France .

OTHER PUBLICATIONS

Brydson, J. A. and Peacock, D. G., "Principles of Plastics Extrusion", 1973, Applied Science Publishers, Ltd., London, pp. 95–105.

Griff, Allan L., "Plastics Extrusion Technology", 2nd. ed., 1976, Robert E. Krieger Publishing Co., New York, pp. 10–11.

*Primary Examiner*—Jay H. Woo
*Assistant Examiner*—Joseph Leyson
*Attorney, Agent, or Firm*—Stephen H. Friskney

[57] ABSTRACT

An apparatus for heating and blending thermoplastic material prior to delivering the material into the barrel of an extruder has an elongated housing which contains two intermeshing feed screws that are driven to rotate in the same direction. Controlled heating is provided by electric band heaters which encircle the exterior of the housing, and electric cartridge heating elements fitted into aluminum cores that are received by an axial bore in each of the feed screws.

7 Claims, 5 Drawing Sheets

PREHEATING APPARATUS FOR AN EXTRUDER

This is a continuation of application Ser. No. 08/008,014 filed on 22 Jan. 1993, now abandoned.

BACKGROUND OF THE INVENTION

1. Field of the Invention

The present invention relates to apparatus for extruding thermoplastic material. More particularly, the present invention relates to apparatus for preheating thermoplastic material as it is blended and fed into the barrel of an extruder.

2. Description of the Related Art

Plastics extruders generally comprise a cylindrical barrel within which one or two plasticating feed screws are rotatably positioned. The plastic material to be processed is introduced into the barrel near the end and is carried therethrough by the screw, which heats and softens the material by physically working it. The heating imparted to the plastic by the mechanical working can be supplemented by externally applied heat as provided, for example, by band heaters applied to the outer circumference of the barrel. The material which issues through a shaping die at the opposite end of the barrel is generally of a fluid or molten state of relatively high viscosity, yet suitable for forming into the particular shapes desired.

In order to improve the output of processed plastic from an extruder, it is known in the art to preheat the thermoplastic material before it enters the extruder, thereby initially contributing some of the heat required for plastication. Since less heat is required to complete plastication, material is in the barrel for a shorter time and is thus processed more quickly. In addition, the preheater enables more stable control of the temperature within the extruder by uniformly heating the material to ensure that it enters the barrel at a consistent preheat temperature.

Preheaters proposed by the prior art have typically used two counter-rotating screws which generate substantial heat by mechanically working the material as it is mixed and ultimately fed into the extruder. Supplemental heating has been provided either on an external surface of the preheater housing or internally of the screws by means of a fluid to help attain the desired preheat temperature.

Although this approach has proven to be workable in many applications, it is unsatisfactory for processing thermoplastic materials with high levels (greater than 20%) of mineral fillers, such as calcium carbonate or talc. Calcium carbonate, for example, is typically included in various PVC compounds used to make plastic pipe. Preheaters are particularly valuable when processing materials of this type since the fillers tend to inhibit heat conduction by the thermoplastic material as it passes through the extruder barrel. However, mechanically working this material with counter-rotating screws, as taught by the prior art, often creates too much heat due to the increased friction associated with the mineral filler; this causes inconsistencies in material flow to the extruder, and can even overheat the material, making it unsuitable for further processing.

Accordingly, it is an object of the present invention to overcome the deficiencies in the prior art arrangements, and to provide an improved preheater for use with extruders which can effectively blend and uniformly heat thermoplastic materials having a high content of mineral fillers.

SUMMARY OF THE INVENTION

Briefly stated, in accordance with one aspect of the present invention, apparatus is provided for use on an extruder for preheating the thermoplastic material just before it enters the extruder barrel. The apparatus includes an elongated housing, a pair of intermeshing feed screws, means for driving the screws so that they rotate in the same direction; and means for providing supplemental heating for the plastic material as it passes through the preheater.

The use of co-rotating screws rather than counter-rotating screws provides a more uniform blending of the materials processed but does not work the material in a way that generates significant heat during the process. Rather, heat is selectively added in a more controlled, uniform manner by external band heaters and cartridge heaters within the screws, thus elevating the temperature of the material while it is simultaneously blended and mixed.

DESCRIPTION OF THE PREFERRED EMBODIMENTS

Figure 1:
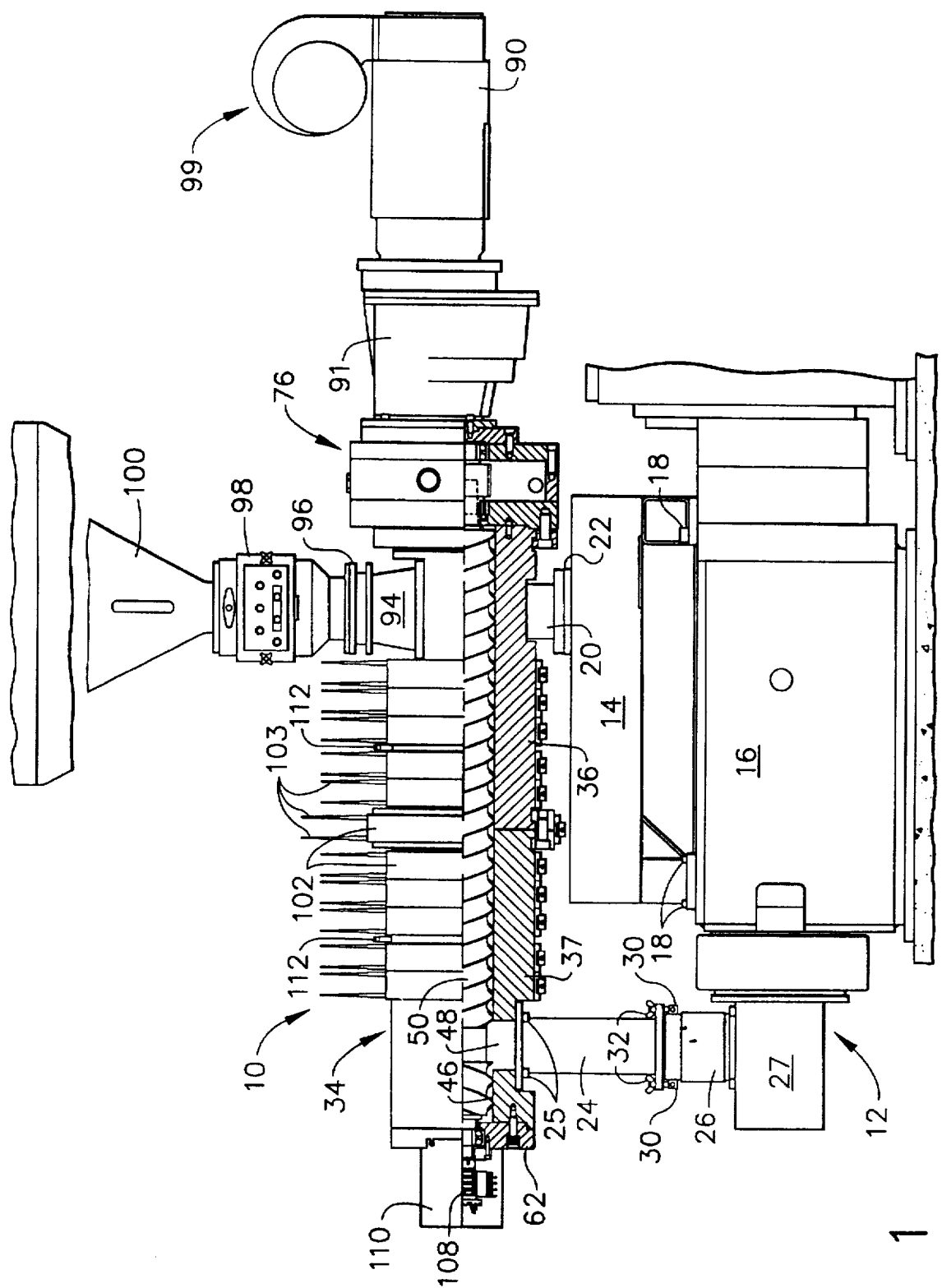
FIG. 1 is a side elevational view of a preheater mounted on an extruder in accordance with the present invention, with certain portions broken away for clarity.
Figure 2:
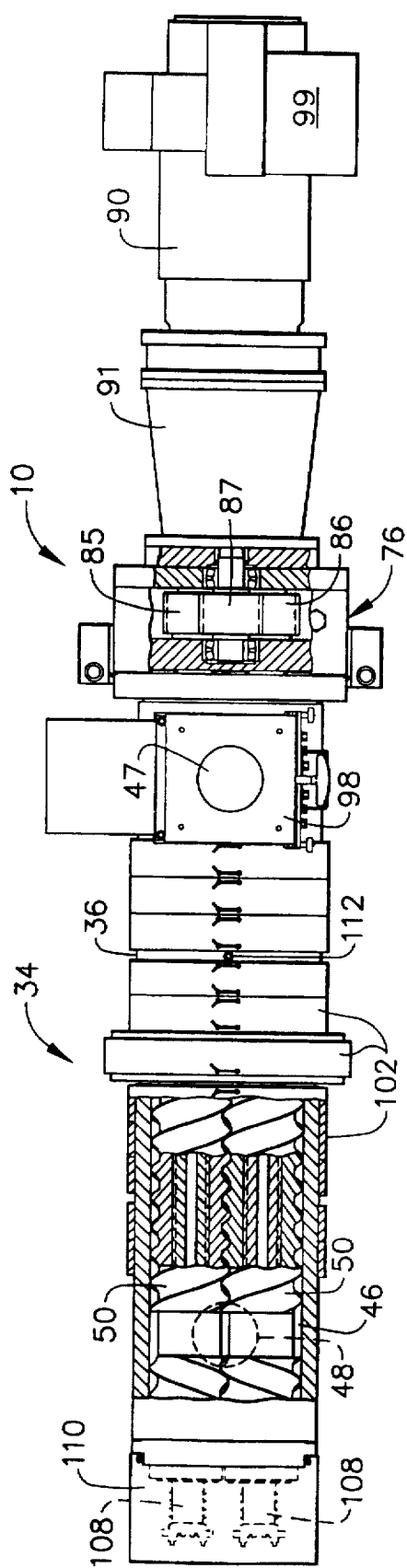
FIG. 2 is a top plan view of the preheater as shown in FIG. 1 with certain portions broken away and the hopper removed for clarity.

Referring now to FIG. 1 and FIG. 2, there is shown a preheater 10 mounted on an extruder 12. More specifically, the attachment of the preheater 10 to the extruder 12 is accomplished by a support frame 14 attached to the gear box housing 16 of the extruder 12 by a number of screws 18. The specific configuration of the support frame 14 is not critical to the present invention; rather, it is manufactured as required to facilitate connection of the preheater 10 to suitable mounting points, which will vary depending on the particular configuration of the extruder 12 (as defined by the manufacturer). A cylindrical swivel plate 20 extends below the preheater 10 and is received by a mating swivel plate retainer 22 affixed to the top of the support frame 14. It should be noted that the swivel plate 20 is positioned on the preheater 10 at a point very near the center of gravity to balance the weight and thus facilitate rotating the preheater 10 on the swivel plate 20, as required, enabling easy access for cleaning or performing other service.

The preheater 10 also connects to the extruder 12 via a throat adapter 24 which is attached to the underside of the preheater by means of screws 25. The throat adapter 24 mates to an cooling throat 26 on the barrel 27 of the extruder 12 with a gasket (not shown), pivoting bolts 30, and wing nuts 32. The throat adapter 24 and cooling throat 26 are both hollow to provide a path for flow of thermoplastic material from the preheater 10 into the barrel 27 of the extruder 12, as will be more fully described in subsequent paragraphs.

Figure 5:
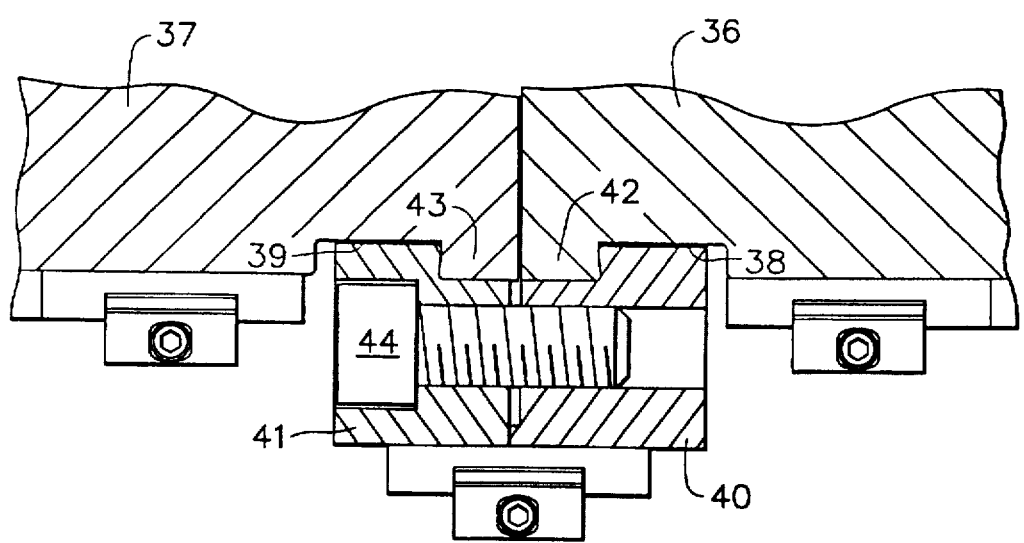
FIG. 5 is an enlarged, fragmentary section view of an intermediate portion of the barrel of the preheater as shown in FIG. 1.

The main body of the preheater 10 includes a barrel 34 that is manufactured in two sections to facilitate fabrication; namely, an inlet section 36 and an outlet section 37. As shown by the detail in FIG. 5, the two sections 36,37 are joined together by split collars 40,41. Specifically, the mating ends of the inlet section 36 and outlet section 37 are provided with annular grooves 38,39 which create shoulders 42,43 on the respective barrel sections. The split collars 40,41 are configured to engage firmly the shoulders 42,43 when drawn tightly together by screws 44. This construction provides a rigid assembly for the elongated barrel 34 as shown.

Figure 7:
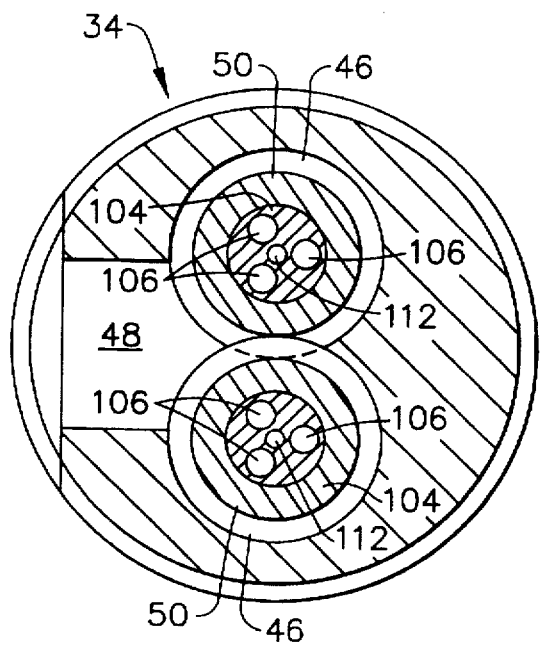
FIG. 7 is an enlarged section view of a portion of the preheater taken along the line 7—7 shown in FIG. 6.

Referring now to FIG. 7, the barrel 34 is provided with an axial bore 46 to receive two feed screws 50. The bore 46 actually comprises two, longitudinally intersecting cylindrical bores, the diameters of which are just slightly greater than the outer diameter of the screws 50. To complete the flow path through the barrel 34, there is an inlet opening 47 through the top of the inlet section 36 which communicates with the bore 46, and an outlet opening 48 similarly joins bore 46 through the bottom of the outlet section 37.

Figure 3:
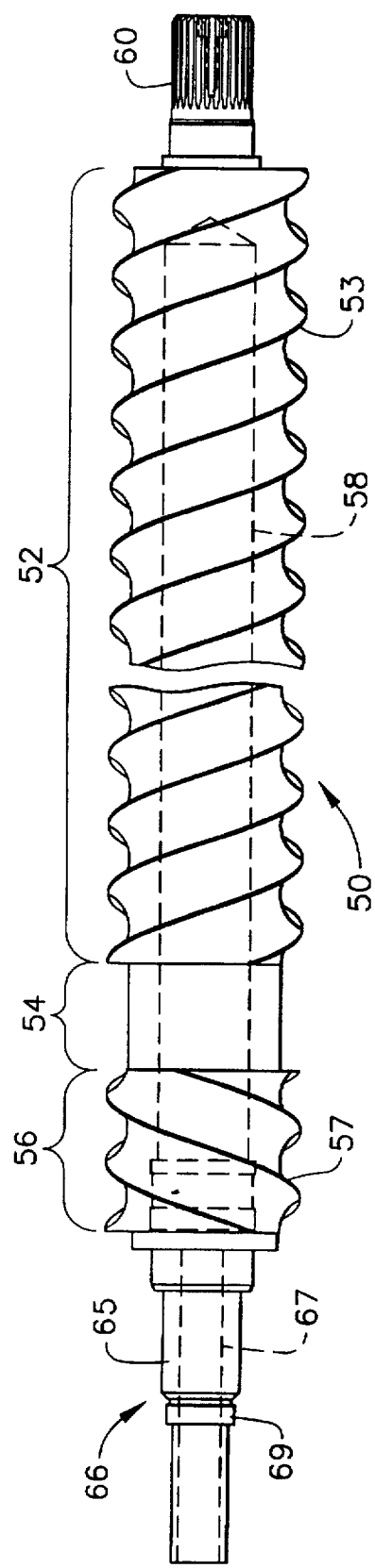
FIG. 3 is a plan view of the feed screw used in the preheater of the present invention.

The two feed screws 50 are identical in construction and have the configuration shown generally in FIG. 3. Specifically, each feed screw 50 has a main body section 52, an open section 54, and a terminal section 56. Both the main body section 52 and terminal section 56 are provided with a helical flight forming a screw channel that is generally U-shaped in cross section. Preferably, the flight of the screws 50 is multiple start with a constant lead. Note also that the flight of the main body section 52 has a right-hand lead 53, while the terminal section 56 has a left-hand lead 57. The open section 54 is cylindrical in cross-section, with the diameter being approximately equal to the root diameter of the main body section 52 and the terminal section 56. Each screw 50 also has a cylindrical axial bore 58 and a spline 60 machined on one end. Threaded into the bore 58 at the end opposite the spline 60, there is a screw tip 66 having multiple cylindrical sections sized for various assembly purposes, as will be more fully described in subsequent paragraphs. The screw tip 66 also has an axial bore 67 which is concentric with the bore 58 in the screws 50.

Figure 4:
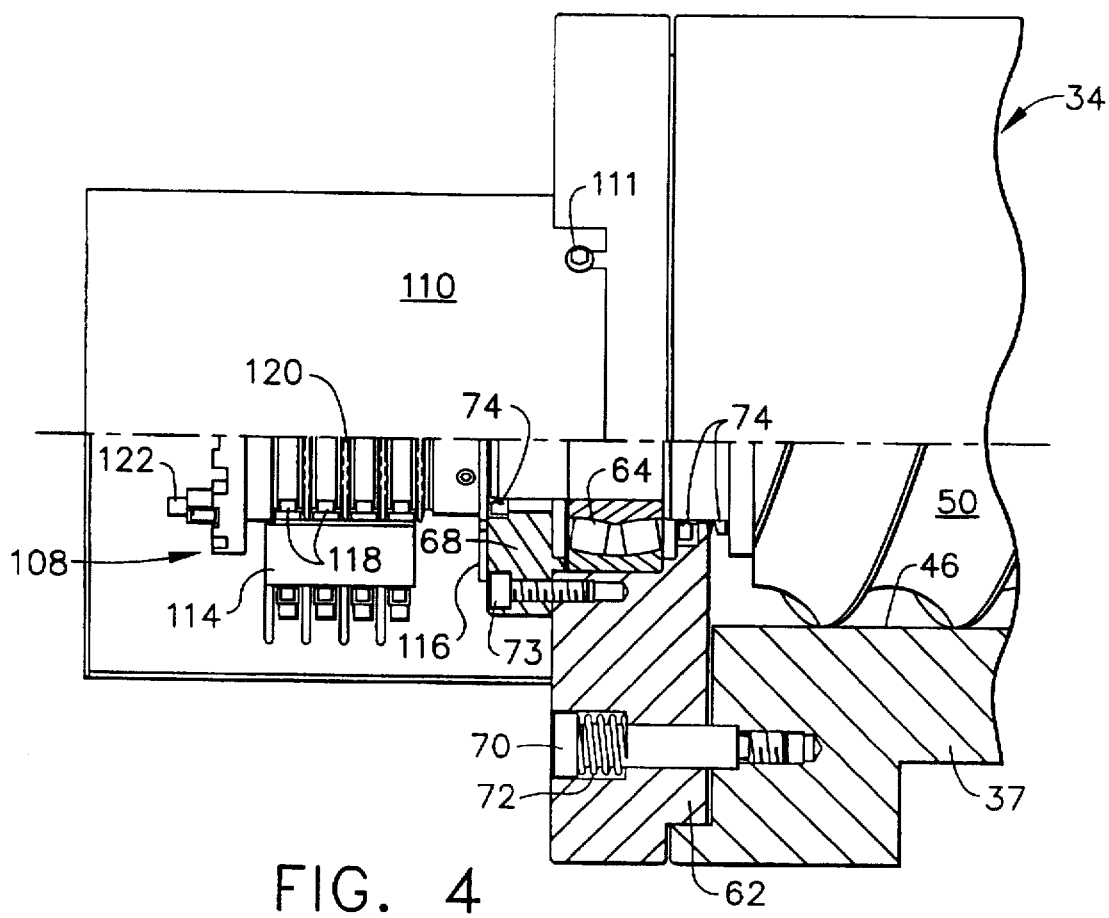
FIG. 4 is an enlarged, fragmentary section view of the end of the preheater as shown in FIG. 1.

As best seen in FIG. 4, the barrel 34 is provided with an end plate 62 on the outlet section 37 to support the ends of the screws 50. Specifically, bearings 64 are provided in the end plate 62 to receive the cylindrical sections 65 of each screw tip 66 nearest the screws 50, thus providing a means of rotatably supporting the ends of the screws 50. A bearing retainer 68 is attached with screws 73 to the end plate 62 to hold the bearings 64 in place. It should be noted that the end plate 62 is held in place by shoulder screws 70 which compress springs 72 against the end plate 62 to provide the desired pressure on the screws 50 which, in turn, bear against associated elements of the drive mechanism (as will be more fully described in subsequent paragraphs). This method of assembly maintains the desired clearance between the intermeshing flights by supporting the screws 50 at each end while allowing for differential thermal expansion between the screws 50 and barrel 34. Finally, annular sealing elements 74 are provided at the locations shown to prevent the bearing 64 from being contaminated with particles of thermoplastic material that are used in conjunction with the preheater 10.

Figure 8:
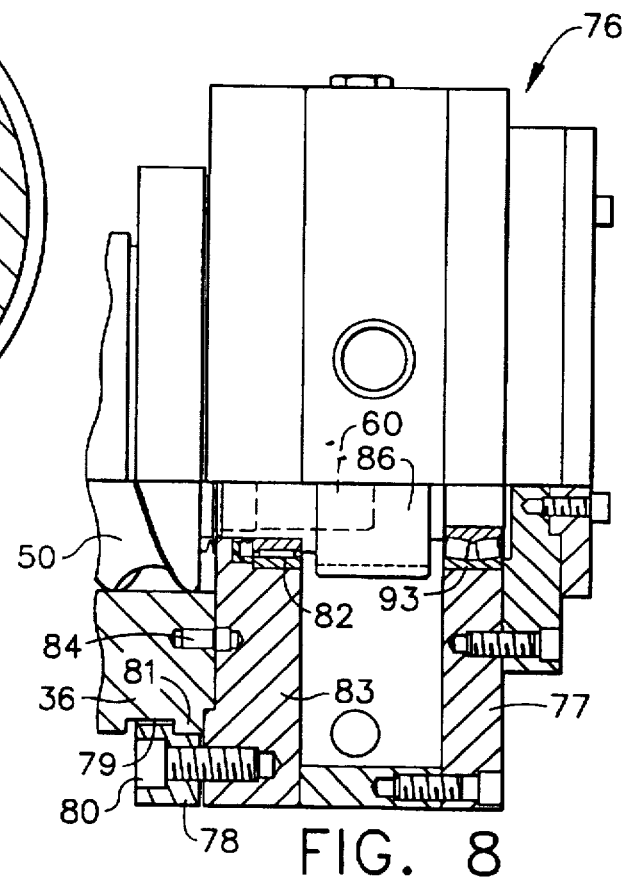
FIG. 8 is an enlarged, fragmentary section view of the distributor housing of the preheater as shown in FIG. 1.

The opposite end of the barrel 34 (the inlet section 36) is similarly closed at distributor housing 76 (see FIG. 8). A split collar 78 is partially received in an annular groove 79 and engages a shoulder 81 created by the groove 79 in the end of the barrel inlet section 36, thereby connecting the barrel 34 to an end wall 83 of the distributor housing 76 when assembled with screws 80. The splines 60 of the feed screws 50 extend into the distributor housing 76 and are piloted into driven gears 85,86 which are supported on one end by needle bearings 82 in the wall 83 of the distributor housing 76 and at the opposite end by bearings 93 in the housing end cap 77. Proper alignment of the barrel 34 with the distributor housing 76 is facilitated by the use of pins 84 received by appropriately located bores in the adjacent components.

Figure 10:
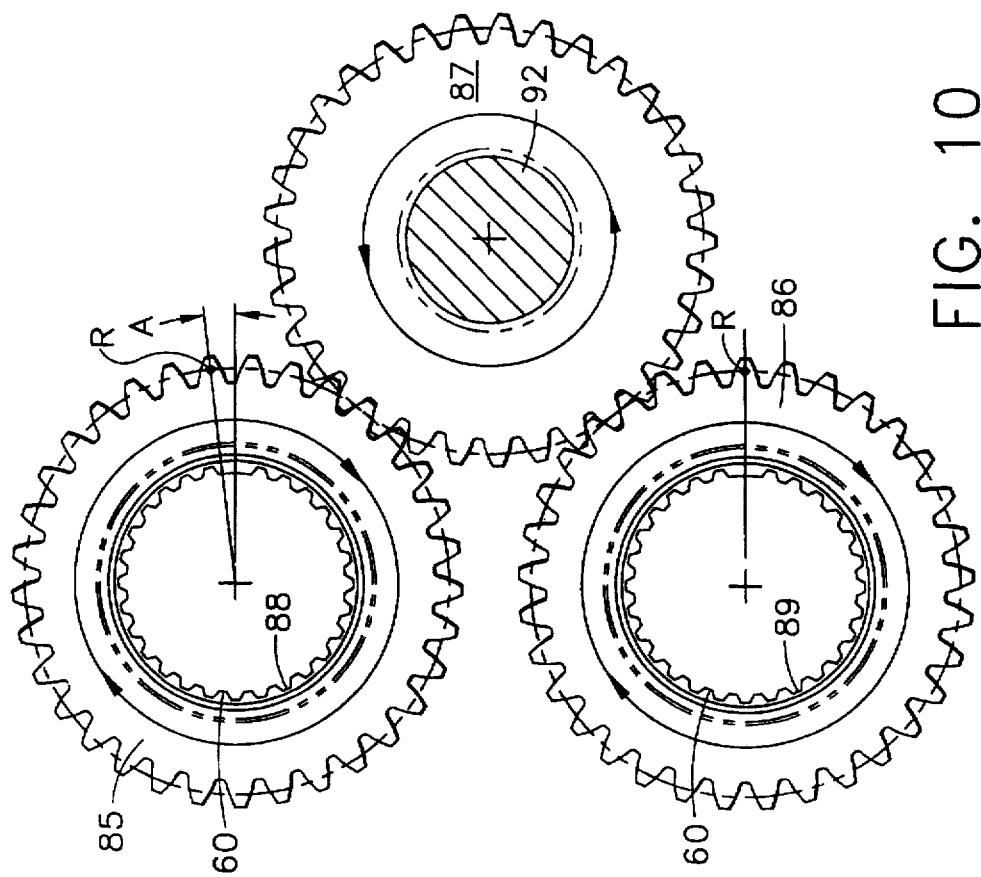
FIG. 10 is a fragmentary view taken along the line 10—10 of FIG. 9 and rotated 90 degrees counterclockwise, diagrammatically illustrating the gear engagement for the drive mechanism.
Figure 9:
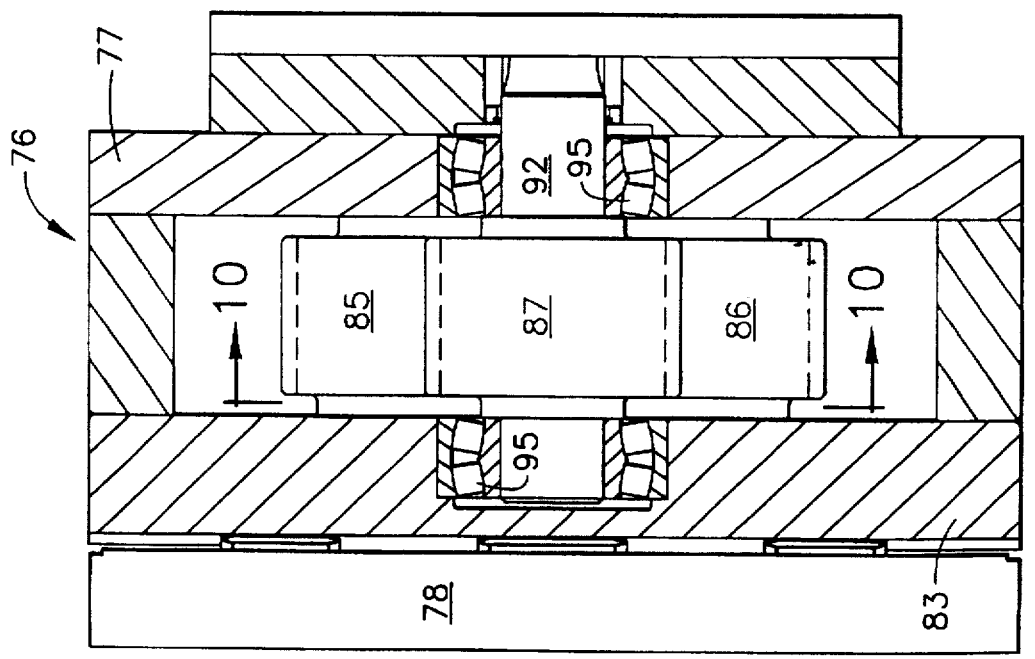
FIG. 9 is an enlarged, fragmentary section view of the distributor housing of the preheater as shown in FIG. 2.

As seen in FIGS. 8–10, the spline 60 of each screw 50 is received within a mating spline 88,89 on the inner diameter of driven gears 85,86. Intermeshing with the driven gears 85,86 is a drive gear 87. The driven gears 85,86 are dimensionally identical; however, the mating spline 88 of gear 85 is offset by an angle A with respect to a reference position R. The effect of this offset A is to establish a different alignment of gear 85 with the helical flight of the associated screw 50, as compared to gear 86 on the adjacent screw. The differing alignments of the driven gears 85,86 enables the proper timing of rotation so that the helical flights of the adjacent screws 50 will intermesh properly, see FIG. 6.

Rotational movement is imparted to drive gear 87 by a motor 90 and gearbox 91 (see FIGS. 1 and 2). Preferably, the motor 90 is provided with an attached blower assembly 99 to supply a cooling air flow during operation. Referring back to FIGS. 8, 9 and 10, the central shaft 92 of drive gear 87 is rotatably supported by bearings 95 fitted at one end in the wall 83 of distributor housing 76, and at the other end in housing end cap 77. As indicated by the arrows in FIG. 10, the drive gear 87 is caused to rotate by the motor 90 through gearbox 91 in a counterclockwise manner, thus causing the driven gears 85,86 to rotate in a clockwise direction and thereby impart a corresponding rotation to the screws 50. As should now be apparent, this gearing arrangement provides a common drive for the screw 50 and maintains the relative timing of the screws 50 to prevent interference between flights.

Referring again to FIGS. 1 and 2, defining the path for thermoplastic material to flow into the preheater 10 is an inlet cooling throat 94 mounted in line with the opening 47 in the inlet section 36 of the barrel 34. The cooling throat 94 prevents conductive heat transfer from the barrel 34 to this portion of the flow path. If the thermoplastic material is heated before it enters the barrel 34, it can become "tacky", causing erratic material flow or, possibly, creating an obstruction in the flow path. A mounting plate 96 adapts the cooling throat 94 for attachment of a drawer magnet 98. The magnet 98 is designed to catch any particles of ferrous metals that may be inadvertently mixed with the thermoplastic material, thus preventing such particles from causing damage to the screws and barrel of preheater 10 or extruder 12. A hopper 100 is mounted atop the drawer magnet 98 to provide a suitable material reservoir.

As stated previously, the function of the preheater 10 is to deliver thoroughly blended plastic to the extruder 12 at a consistent, elevated temperature. As material is blended by the rotating screws 50, some frictional heat is added;

however, the primary heating capabilities of the preheater 10 are provided by two other sources that can be more accurately monitored and controlled. First, there is a series of band heaters 102 encircling the outer surface of the barrel 34. The heaters 102 are electrical resistance units with suitable wire leads 103 to facilitate wiring at assembly, as are typically used in the art for this type of application.

Figure 6:
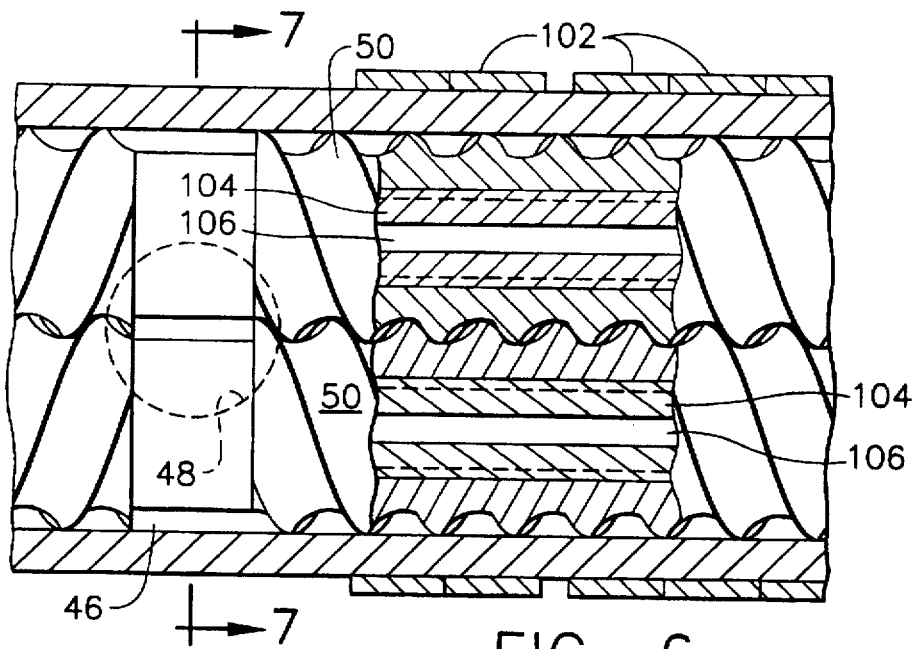
FIG. 6 is an enlarged, fragmentary section view of an intermediate portion of the preheater as shown in FIG. 2.

The second source of supplemental heating comes from within aluminum heater cores 104 that are inserted into the axial bores 58 of each feed screw 50. Specifically, as shown in FIGS. 6 and 7, the heater cores 104 are elongated aluminum cylinders with three equally spaced longitudinal bores to receive cartridge heating elements 106. The cores 104 thus provide a means to dissipate uniformly the heat supplied by heating elements 106 within the bore 58 of the screws 50.

Since the heating elements 106 are preferably electric resistance, rod type, power is supplied via slip ring assemblies 108 (see FIG. 4). More specifically, power is supplied to each brush block assembly 114 which is held in place by a post and plate assembly 116 bolted to the bearing retainer 68. Spring loaded brushes 118 transfer electrical current to collector ring assemblies 120 that are attached to threaded sections 69 of the screw tips 66. This construction provides rotary contacts to supply power to the cartridge heaters 106 through electrical wiring (not shown) which connects the heaters 106 to terminal posts 122 on the collector ring assemblies 120, the bores 67 in screw tips 66 providing conduits for passage of the electrical wiring. A cover 110 is attached with screws 111 to end plate 62 to prevent the contact surfaces of the slip ring assemblies 108 from becoming contaminated and adversely affecting their ability to conduct electricity. To facilitate accurate temperature control, thermocouples 112 are provided in the barrel 34 and in the heater cores 104.

In operation, thermoplastic material is gravity fed into the preheater 10 from the hopper 100, passing through the drawer magnet 98, through the cooling throat 94, and into the opening 47 of inlet section 36 of the barrel 34. When the material enters the barrel 34, it is deposited on the feed screws 50 which are both rotating clockwise (as viewed from the exit end of the preheater 10). The rotation of the intermeshing screws 50 serves to blend the material and simultaneously advance it toward the outlet 48 of outlet section 37 of the barrel 34. As the material moves through the barrel 34 from the inlet 47 toward the outlet 48, it is heated by conduction from the inner surface of the barrel 34 which is first heated by the band heaters 102, and conduction from the surface of the feed screws 50 which are heated internally by the cartridge heating elements 106. The material temperature is closely controlled by regulating the power to heating elements 102 and 106, as necessary, to achieve the desired respective temperatures in the barrel 34 and screws 50, as indicated by thermocouples 112. As the material reaches the open section 54 of the screws 50, internal pressure causes it to exit the preheater 10 through the outlet 48 of the barrel 34. It should be noted that the right-hand lead 53 on the main body 52 of the screws 50 and the left-hand lead 57 on the terminal section 56 concurrently act to advance material toward the feed section 54, creating the internal pressure which acts to move the material through the outlet 48. The thermoplastic material then passes on through the throat adapter 24, through the cooling throat 26 and into the extruder barrel 27.

The material leaving the preheater 10 and entering the extruder 12 has been thoroughly blended and heated to an optimal temperature for further processing. It can thus be seen that the present invention provides distinct advantages over the preheaters disclosed in the prior art, in that it delivers a consistent flow of thermoplastic material directly to the extruder barrel, thereby enabling maximum production rates.

Although particular embodiments of the present invention have been illustrated and described, it will be apparent to those skilled in the art that various changes and modifications can be made without departing from the spirit of the present invention. For example, instead of electric cartridge heaters, a temperature controlled fluid could be circulated, as desired, through the feed screws to provide supplemental heating. Alternatively, various flight configurations for the feed screws can effectively blend and advance the material. It is therefore intended to encompass within the appended claims all such changes and modifications that fall within the scope of the present invention.

What is claimed is:

1. An apparatus for preheating thermoplastic material prior to entry of the material into an extruder barrel, comprising:

an elongated housing having a central bore, an inlet adjacent a first end of the housing, and an outlet between the inlet and a second end opposite the first end of the housing, both the inlet and the outlet intersecting the central bore;

a material flow path beginning at the inlet, continuing through the central bore, and passing from the central bore through the outlet;

a pair of adjacent, parallel feed screws received within the central bore of the housing for blending the thermoplastic material and advancing it along the material flow path, each feed screw having a main body section having a helical flight configured to form a screw channel that is generally U-shared in cross-section and to advance the material from the inlet toward the outlet when the feed screw is rotated, an open section having a constant diameter, and a terminal section having a helical flight configured to form a screw channel that is generally U-shaped in cross-section and with a lead opposite that of the main body section, such that the main body section extends from the inlet to the open section which is adjacent the outlet, and the terminal section extends from the open section to the second end of the housing;

drive means for rotating the feed screws in the same direction within the central bore; and means for heating the thermoplastic material to a desired temperature as it is blended and advanced along the material flow path.

2. The apparatus of claim 1 wherein the feed screws are positioned within the elongated housing such that the helical flights of the adjacent screws intermesh.

3. The apparatus of claim 2 wherein the drive means for rotating the feed screws in the same direction includes a driven gear non-rotatably fitted on each of the feed screws, and a drive gear that engages both of the driven gears.

4. The apparatus of claim 1 wherein the open section of each of the feed screws has a cylindrical configuration with a diameter approximately equal to the root diameter of the screw.

5. The apparatus of claim 1 wherein the material heating means includes means disposed within the feed screws for directly heating the feed screws.

6. The apparatus of claim 5 wherein the means for heating the feed screws includes a cylindrical heater core that is received by an axial bore in each of the feed screws, the heater core having at least one longitudinal bore to receive an electric, rod-like heating element.

7. The apparatus of claim 5 wherein the material heating means further includes electric band heaters mounted on the exterior of the housing.

* * * * *